United States Patent [19]

Sasaki

[11] Patent Number: 4,558,349
[45] Date of Patent: Dec. 10, 1985

[54] COLOR SUBCARRIER GENERATOR

[75] Inventor: Tadao Sasaki, Tokyo, Japan

[73] Assignee: Sony Corporation, Tokyo, Japan

[21] Appl. No.: 452,756

[22] Filed: Dec. 23, 1982

[30] Foreign Application Priority Data

Dec. 25, 1981 [JP] Japan ................... 56-211257

[51] Int. Cl.⁴ .............................................. H04N 9/44
[52] U.S. Cl. .................................. 358/16; 358/17
[58] Field of Search ................. 358/16, 17, 12, 15

[56] References Cited

U.S. PATENT DOCUMENTS 4,278,972  7/1981  Wozniak .......................... 358/17
4,295,157  10/1981  Machida et al. ................ 358/16

Primary Examiner—Tommy P. Chin
Attorney, Agent, or Firm—Lewis H. Eslinger; Alvin Sinderbrand

[57] ABSTRACT

A color subcarrier generator used with a system for converting data representing color displays into a composite color video signal suitable for display by a visual display apparatus comprises an oscillator which generates a system clock signal with a predetermined frequency, a frequency divider responsive to the system clock signal from the oscillator which generates horizontal and vertical sync signals for the visual display apparatus and a dot clock signal for timing sequential dots of the horizontal lines of the composite color video signal into which the data is converted and a subcarrier generating circuit which generates a color subcarrier signal to be included in the composite color video signal and which is synchronized in phase with the horizontal sync signal.

22 Claims, 2 Drawing Figures

COLOR SUBCARRIER GENERATOR

BACKGROUND OF THE INVENTION

1. Field of the Invention

This invention relates to video display apparatuses, and more particularly, to a color subcarrier generator for use with a microcomputer system in which color data is converted into a standard color video signal for display on a visual display apparatus.

2. Description of the Prior Art

In the NTSC television system, luminance and chrominance signals are interleaved together on a color subcarrier signal included in the composite video signal. The color subcarrier signal is located at the 455th odd harmonic of one-half the horizontal sweep rate, and has an approximate frequency of 3.58 MHz. The following equation expresses the relationship between the frequency of the color subcarrier $f_{sc}$ and the frequency $f_H$ of the horizontal sweep:

$$f_{sc} = \frac{455}{2} \times f_H \quad (1)$$
$$= \frac{5 \times 7 \times 13}{2} \times f_H$$

In a microcomputer system in which color data are displayed on a visual display apparatus such as a color cathode ray tube, if the total number of picture elements for one line is N, the following equation expresses the relationship between the frequency $f_{dot}$ of a dot clock signal used for clocking the dots comprising one line of a character and the frequency $f_H$ of the horizontal sync signal:

$$f_{dot} = N \times f_H \quad (2)$$

In prior art systems, separate oscillators have been used to generate the frequencies $f_{dot}$ and $f_{sc}$. It has been difficult to satisfy the relations expressed in equations 1 and 2 by using separate oscillators, however, since the frequencies $f_{dot}$ and $f_{sc}$ cannot be easily synchronized.

The use of separate, unsynchronized oscillators to generate $f_{dot}$ and $f_{sc}$ poses significant problems. The color on the display apparatus can flicker. A moire pattern can also be formed around a displayed figure.

One proposal uses a single oscillator instead of two in order to overcome the problems with two oscillators. The output signal from the single oscillator is divided to derive both the clock frequency and the color subcarrier frequency. In other words, the signal from the oscillator is divided by m to derive the color subcarrier frequency $f_{sc}$, and is divided by n to derive the clock frequency $f_{dot}$. If the frequency of the oscillator is $f_0$, the following equation represents the relationship between the frequency of the oscillator and the frequency of the color subcarrier generator:

$$f_0 = m \times f_{sc} \quad (3)$$
$$= \frac{5 \times 7 \times 13}{2} \times f_H$$

The following equation expresses the relationship between the frequency of the oscillator and the frequency of the clock signal:

$$f_0 = n \times f_{dot} \quad (4)$$
$$= n \times N \times f_H$$

Substituting in equations 3 and 4, the following relationship is derived:

$$n \times f_{dot} = \frac{2 \times n \times N \times f_{sc}}{5 \times 7 \times 13} \quad (5)$$

The following expression for m is derived from equations 1 to 5:

$$m = \frac{2 \times n \times N}{5 \times 7 \times 13} \quad (6)$$

In equation 6, it is to be appreciated that the numbers n and N must be multiples of 5, 7 or 13 so that m is an integer. If N, the number of picture elements on one line, is an arbitrary number, for example, 1024 or 1000, the number n must be an integral multiple of 455 ($5 \times 7 \times 13$) for m to be an integer. Accordingly, the frequency $f_0$ of the oscillator must be very high, in the range of 7 to 8 GHz, if N is an arbitrarily large number. However, such a high frequency oscillator is undesirable because of unnecessary radiation, the difficulty of making the necessary frequency divisions, and the like. One solution to this problem has been to restrict the total number of picture elements to an integral multiple of 455 (or a subcombination thereof, for example, 65 or 91) so that the number n is an arbitrary value and the frequency $f_0$ is not quite so high.

OBJECTS AND SUMMARY OF THE INVENTION

It is an object of the present invention to provide a color subcarrier generator which does not place a limit on the total number of picture elements which can be displayed on one line of a visual display apparatus.

It is another object of the present invention to provide a color subcarrier generator which does not produce undesirable color flicker when a figure is displayed on a visual display apparatus.

It is yet another object of the present invention to provide a color subcarrier generator which does not produce a moire pattern around a figure displayed in color on a visual display apparatus.

It is yet another object of the present invention to provide a color subcarrier generator with an oscillator which utilizes a medium level frequency.

In accord with the present invention, a color subcarrier generator for use with a system for converting data representing color displays into a composite color video signal suitable for display by a visual display apparatus comprises oscillating means for generating a system clock signal with a predetermined frequency, frequency dividing means responsive to the system clock signal from the oscillator for generating horizontal and vertical sync signals and a dot clock signal for timing sequential dots of the horizontal lines of the composite color video signal into which the data is converted, and subcarrier generating means for generating a color subcarrier signal to be included in the composite color video signal and which is synchronized in phase with the horizontal sync signal.

The above, and other objects, features and advantages of the present invention will be apparent from the

DESCRIPTION OF THE PREFERRED EMBODIMENT

Figure 1:
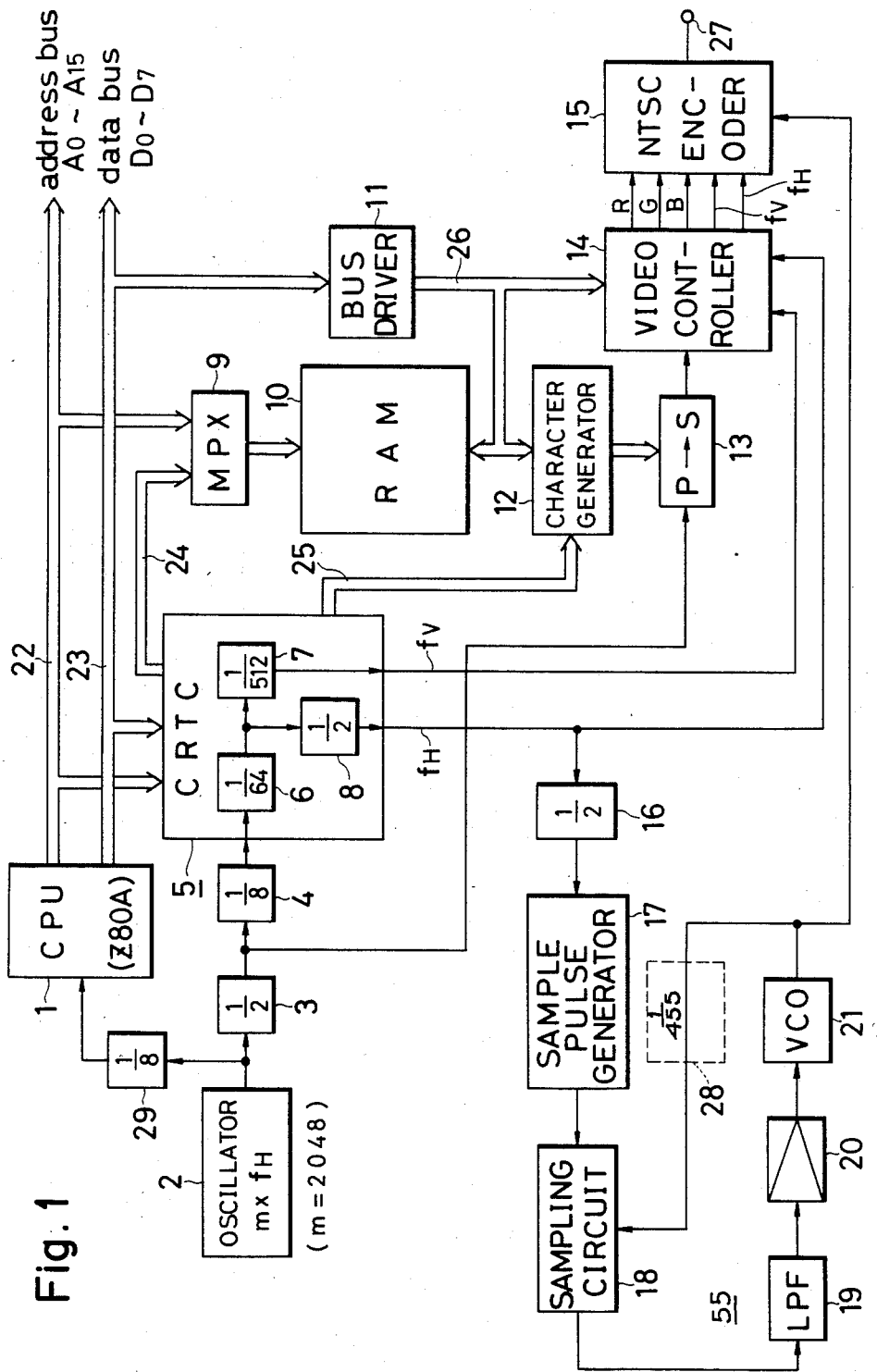
FIG. 1 is a schematic block diagram illustrating a microcomputer system including an embodiment of a color subcarrier generator in accord with the present invention.

Referring to the drawings in detail, and initially to FIG. 1 thereof, a microcomputer system encodes color display data into an NTSC composite color television signal and includes an embodiment of a color subcarrier generator in accord with the present invention. A central processing unit (CPU) 1 supplies data $D_0 \sim D_7$ along a data bus 23 and addresses $A_0 \sim A_{15}$ along an address bus 22. CPU 1 can be, in one embodiment, a Z80A unit manufactured by Zilog, Inc. A cathode ray tube controller (CRTC) 5 receives data $D_0 \sim D_7$ and addresses $A_0 \sim A_{15}$ from CPU 1 and supplies display addresses through a multiplexer (MPX) 9 to access a random access memory (RAM) 10. CRTC 5 can be, in one embodiment, an HD46505 unit manufactured by Hitachi. Multiplexer 9 selects either the address from CPU 1 or the address from CRTC 5 to access the data in RAM 10, as is known.

A crystal oscillator 2 generates an oscillator signal having a frequency $f_0$ which is, in the preferred embodiment, an integral multiple of a horizontal scanning frequency $f_H$ (where horizontal scanning frequency $f_H$ is approximately equal to the horizontal scanning frequency in the NTSC color television signal). The relationship between oscillator frequency $f_0$ and horizontal scanning frequency $f_H$ can be expressed as:

$$f_0 = m \times f_H$$

where m is an integer. In the illustrative embodiment, m is selected to be 2048.

The oscillator signal from oscillator 2 is supplied to a divider 3 which generates a dot clock signal having a frequency $f_{dot}$. The dot clock signal is used for clocking or reading out the dots comprising each line of a displayed character. In the illustrative embodiment, divider 3 divides frequency $f_0$ by two. Thus, the relationship between $f_0$ and $f_{dot}$ can be expressed as follows:

$$f_o = 2 \times f_{dot}$$

The oscillator signal from oscillator 2 is also supplied to a divider 29 which divides frequency $f_0$ by 8 and supplies a CPU clock signal having a frequency $f_{cpu}$ to CPU 1.

The dot clock signal having frequency $f_{dot}$ is supplied to a second frequency divider 4 which generates a character clock signal having a frequency $f_{chr}$ for clocking or reading out each displayed character. In the illustrative embodiment, frequency divider 4 divides the frequency $f_{dot}$ by 8. Mathematically, the above relations can be expressed as follows:

$$\begin{aligned} f_0 &= 2048 \times f_H \\ f_{dot} &= \tfrac{1}{2} \times f_0 \\ &= 1024 \times f_H \\ f_{chr} &= \tfrac{1}{8} \times f_{dot} \\ &= 1/16 \times f_0 \\ &= 128 \times f_H \end{aligned}$$

In the illustrative embodiment, each character displayed on the visual display apparatus is comprised of 8 horizontally arranged dots on one line, and each horizontal line has 80 characters displayed thereon.

The character clock signal having frequency $f_{chr}$ from frequency divider 4 is supplied to CRTC 5 which includes a 1/64 divider 6, a 1/512 divider 7, and a $\tfrac{1}{2}$ divider 8. Divider 6 and divider 8 generate a horizontal sync signal having frequency $f_H$, while divider 6 and divider 7 generate a vertical sync signal having frequency $f_V$. The horizontal and vertical sync signals are, in the preferred embodiment, approximately equal to the horizontal and vertical sync signals in the NTSC television signal system.

A data bus driver 11 supplies data $D_0 \sim D_7$ from data bus 23 to RAM 10 along data bus 26. It is to be appreciated that address bus 22 and multiplexer 9 supply addresses $A_0 \sim A_{15}$. A corresponding to data $D_0 \sim D_7$ to be stored in RAM 10.

As is known in the art, CRTC 5 reads data stored in RAM 10 by generating a display address and supplying the display address along data bus 24 to multiplexer 9.

The data stored in RAM 10 include character data and color data. The character data are supplied to a character generator 12, while the color data are supplied to a video controller 14. Character generator 12 also receives read addresses from CRTC 5 along address bus 25 and supplies dot character signals in parallel which correspond to each character to a parallel to serial converter 13. The parallel dot character signals from character generator 12 are converted into serial dot character signals by parallel to serial converter 13 in response to the dot clock signal having frequency $f_{dot}$ from frequency divider 3. The dot character signals from parallel to serial converter 13 are supplied to video controller 14. Video controller 14 also receives the horizontal and vertical sync signals with frequencies $f_H$ and $f_V$, respectively, from CRTC 5 and generates red, blue and green color video signals which are supplied to an NTSC encoder 15. The horizontal and vertical sync signals are also supplied to NTSC encoder 15 from video controller 14. NTSC encoder 15 supplies a composite video signal to an output terminal 27.

NTSC encoder 15 is also supplied with the color subcarrier signal having frequency $f_{sc}$. Unlike prior art systems, the color subcarrier signal with frequency $f_{sc}$ is derived from the horizontal sync signal having frequency $f_H$ from CRTC 5.

The color subcarrier generator in accord with the present invention includes a voltage controlled oscillator (VCO) 21 which generates the color subcarrier signal having frequency $f_{sc}$. A control voltage for voltage controlled oscillator 21 is based upon the frequency $f_H$ of the horizontal sync signal from CRTC 5. In particular, the horizontal synchronizing signal having frequency $f_H$ is supplied to a frequency divider 16 which, in the preferred embodiment, divides frequency $f_H$ by 2. The output signal from frequency divider 16 is supplied to a sample pulse generator 17 which generates control pulses to actuate a sampling circuit 18. Sampling circuit 18 samples the color subcarrier signal and generates a sampled output signal to be supplied to a low-pass filter 19, a DC amplifier 20, and voltage controlled oscillator 21. In the illustrated embodiment, a sample pulse is generated at every other horizontal sync signal, and has a pulse width which is one-quarter of the frequency of the 3.58 MHz color subcarrier signal. It is to be appreciated that sampling circuit 18, low-pass filter 19, DC amplifier 20 and voltage controlled oscillator 21 comprise a phase locked loop (PLL) circuit 55.

Figure 2:
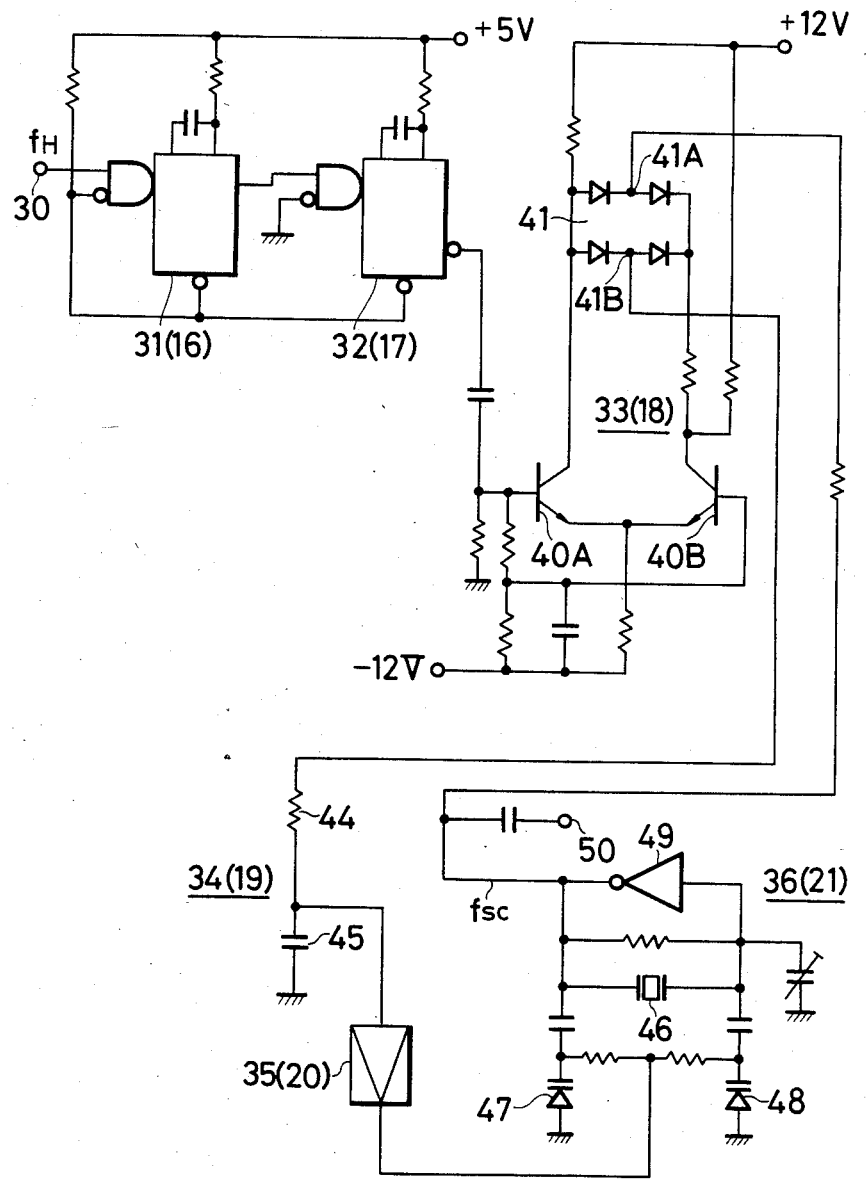
FIG. 2 is a detailed circuit diagram of a portion of the embodiment of the color subcarrier generator of FIG. 1.

In FIG. 2, the horizontal sync signal having frequency $f_H$ from CRTC 5 is supplied through an input terminal 30 to a pair of mono-stable multi-vibrators (one-shots) 31, 32. (The corresponding parts or elements of FIG. 1 are indicated in FIG. 2 in parenthese). One-shot 31 divides the frequency $f_H$ of the horizontal sync signal by two. One-shot 32 generates a sample pulse signal having a width one-quarter the frequency of the color subcarrier signal (3.58 MHz) at every other horizontal sync signal.

The sampled pulse is supplied to a sampling circuit 33 (indicated by reference numeral 18 in FIG. 1) comprising a differentially connected pair of transistors 40A, 40B and a diode bridge circuit 41. The sampled pulse renders transistor 40A non-conductive when it is supplied thereto. When transistor 40A is non-conductive, transistor 40B and the diodes comprising diode bridge circuit 41 become conductive. In the illustrative embodiment, the color subcarrier signal having frequency $f_{sc}$ from voltage controlled oscillator 36 (indicated by reference numeral 21 in FIG. 1) is sampled and supplied to low-pass filter 34 (indicated by reference numeral 19 in FIG. 1) through a pair of junctions 41A, 41B in diode bridge circuit 41.

Low-pass filter 34 includes a resistor 44 and a capacitor 45. The output signal of low-pass filter 34 is supplied to a voltage controlled oscillator 36 through a buffer amplifier 35 (indicated by reference numeral 20 in FIG. 1).

Voltage controlled oscillator 36 includes a crystal oscillator 46, a pair of variable capacitance diodes 47, 48, and an inverter 49. The color subcarrier signal with frequency $f_{sc}$ is supplied to NTSC encoder 15 through output terminal 50.

In the illustrated embodiment, the color subcarrier signal is directly supplied to sampling circuit 18. Since the frequency $f_{sc}$ of this signal is high (3.58 MHz), PLL circuit 55 (see FIG. 1) can have difficulty in properly locking the signals in phase. Crystal oscillator 46 is included in voltage controlled oscillator 36 to remedy this difficulty.

Alternatively, a 1/455 divider 28 can be disposed between sampling circuit 18 and voltage controlled oscillator 21, as illustrated in the phantom lines of FIG. 1. Only a 15.75 KHz signal is supplied to sampling circuit 18 in such an arrangement. Since this frequency is lower then the 3.58 MHz frequency of the color subcarrier signal, the signals can be more easily locked in phase.

It is to be appreciated that the color subcarrier generator in accord with the present invention utilizes a single oscillator having a frequency $f_0$ which is an integral multiple of the frequency $f_H$ of the horizontal sync signal. In the color subcarrier generator, the frequencies $f_H$ and $f_V$ for the horizontal and vertical sync signals, respectively, are generated by dividing the frequency $f_0$ from the oscillator. The color subcarrier signal with frequency $f_{sc}$ is derived from the frequency $f_H$ of the horizontal sync signal so that the color subcarrier signal and the horizontal sync signal are synchronized with each other.

It is to be further appreciated that a microcomputer system employing a color subcarrier generator in accord with the present invention does not have to have an integral multiple of 455 picture elements on a horizontal line. As another advantage of a color subcarrier generator in accord with the present invention, color flicker of a displayed image is avoided.

Although a specific embodiment of the present invention has been described in detail herein with reference to the accompanying drawings, it is to be understood that the invention is not limited to that precise embodiment, and that various changes and modifications may be effected therein by one skilled in the art without departing from the spirit and scope of the invention as defined in the appended claims

What is claimed is:

1. In a system for converting data representing color displays into a composite color video signal suitable for display by a visual display apparatus, the combination comprising:
   oscillating means for generating a system clock signal with a predetermined frequency;
   frequency dividing means responsive to said system clock signal from said oscillating means for generating horizontal and vertical sync signals and a dot clock signal;
   means responsive to said horizontal and vertical sync signals for timing horizontal and vertical scan of said visual display apparatus;
   means responsive to said dot clock signal for timing sequential dots of the horizontal lines of the composite color video signal into which said data is converted;
   subcarrier generating means responsive to and synchronized in phase with said horizontal sync signal for generating a color subcarrier signal; and
   means responsive to said color subcarrier signal for forming the composite color video signal.

2. The system of claim 1; wherein said predetermined frequency of said system clock signal is an integral multiple of the frequency of said horizontal sync signal.

3. The system of claim 1; wherein the frequencies of said horizontal and vertical sync signals and said color subcarrier signal are approximately equal to the frequencies of NTSC horizontal and vertical sync signals and an NTSC color subcarrier signal, respectively.

4. The system of claim 1; wherein said frequency dividing means comprises:
   first frequency dividing means for receiving said system clock signal from said oscillating means and generating said dot clock signal; and
   second frequency dividing means for receiving said dot clock signal and generating said horizontal sync signal in response thereto.

5. In a system for converting data representing color displays into a composite color video signal suitable for display by a visual display apparatus, the combination comprising:
   oscillating means for generating a system clock signal with a predetermined frequency;
   frequency dividing means responsive to said system clock signal from said oscillating means for generating horizontal and vertical sync signals and a dot clock signal;

means responsive to said horizontal and vertical sync signal for timing horizontal and vertical scan of said visual display apparatus;

means responsive to said dot clock signal for timing sequential dots of the horizontal lines of the composite color video signal into which said data is converted;

subcarrier generating means responsive to and synchronized in phase with said horizontal sync signal for generating a color subcarrier signal; and means responsive to said color subcarrier signal for forming the composite color video signal;

said frequency dividing means comprising:

first frequency dividing means for receiving said system clock signal from said oscillating means and generating said dot clock signal; and second frequency dividing means for receiving said dot clock signal and generating said horizontal sync signal in response thereto; and said second frequency dividing means including character frequency dividing means for receiving said dot clock signal and generating a character clock signal in response thereto; and means responsive to said character clock signal for reading out each displayed character.

6. The system of claim 5; in which said composite color video signal is displayed as characters, and each character comprises a predetermined number of dots in each of said horizontal lines; and wherein said character frequency dividing means divides the frequency of said dot clock signal by said predetermined number of dots.

7. The system of claim 6; wherein said predetermined number of dots is eight.

8. The system of claim 1; wherein said means for generating said color subcarrier signal comprises a voltage controlled oscillator locked in phase with said horizontal sync signal.

9. The system of claim 8; wherein said subcarrier generating means includes:

voltage controlled oscillating means for determining the frequency of said color subcarrier signal in response to a control voltage supplied thereto; and sampling means jointly responsive to said horizontal sync signal and said color subcarrier signal for generating said control voltage for said voltage controlled oscillating means.

10. In a system for converting data representing color displays into a composite color video signal suitable for display by a visual display apparatus, the combination comprising:

oscillating means for generating a system clock signal with a predetermined frequency;

frequency dividing means responsive to said system clock signal from said oscillating means for generating horizontal and vertical sync signals and a dot clock signal;

means responsive to said horizontal and vertical sync signals for timing horizontal and vertical scan of said visual display apparatus;

means responsive to said dot clock signal for timing sequential dots of the horizontal lines of the composite color video signal into which said data is converted;

color subcarrier signal generating means, said subcarrier generating means including:

sample pulse generating means for generating sampling pulses in response to said horizontal sync signal;

a sampling circuit for producing a sampling output signal;

low pass filter means responsive to said sampling output signal for producing a control voltage; and voltage controlled oscillating means responsive to said control voltage for generating said color subcarrier signal, said sampling circuit being jointly responsive to said sampling pulses and said color subcarrier signal;

further comprising means responsive to said color subcarrier signal for forming said composite color video signal.

11. The system of claim 10; wherein said subcarrier generating means further includes frequency dividing means for receiving said horizontal sync signal and supplying a timing signal in response thereto to actuate said sample pulse generating means.

12. The system of claim 11; wherein said frequency dividing means included in said subcarrier generating means divides said horizontal sync signal by two whereby said color subcarrier signal is sampled at every other horizontal sync signal.

13. The system of claim 10; wherein said subcarrier generating means further includes:

low pass filter means connected to said sampling means for generating a filtered sampled voltage; and amplifier means for amplifying said filtered sampled voltage and supplying the same as said control voltage to said voltage controlled oscillating means.

14. The system of claim 13; wherein said subcarrier generating means further includes frequency dividing means connected to said voltage controlled oscillating means for providing a frequency divided color subcarrier signal and supplying said frequency divided color subcarrier signal to said sampling means for sampling thereby.

15. The system of claim 1; and further comprising a central processor unit for generating said data.

16. The system of claim 15; and further comprising frequency dividing means for receiving said system clock signal and generating a central processing unit clock signal bearing a predetermined relation to said dot clock signal, whereby said central processing unit generates said data in synchronism with said dot clock signal.

17. The system of claim 15; and further comprising memory means for storing said data.

18. The system of claim 17; and further comprising cathode ray tube controller means for selectively reading said data stored in said memory means.

19. The system of claim 18; wherein said frequency dividing means is, at least in part, included in said cathode ray tube controller means and said cathode ray tube controller means receives said dot clock signal and generates said horizontal and vertical sync signals in response thereto.

20. The system of claim 18, in which said microprocessor means and said cathode ray tube controller means read said data stored in said memory means by supplying address signals thereto; and further comprising multiplexer means for alternately supplying said address signals from said central processing unit and said cathode ray tube controller means to said memory means to read said data stored therein.

21. In a system for converting data representing color displays into a composite color video signal suitable for display by a visual display apparatus, the combination comprising:

oscillating means for generating a system clock signal with a predetermined frequency;

frequency dividing means responsive to said system clock signal from said oscillating means for generating horizontal and vertical sync signals and a dot clock signal;

means responsive to said horizontal and vertical sync signals for timing horizontal and vertical scan of said visual display apparatus;

means responsive to said dot clock signal for timing sequential dots of the horizontal lines of the composite color video signal into which said data is converted;

subcarrier generating means responsive to and synchronized with said horizontal sync signal for generating a color subcarrier signal; and means responsive to said color subcarrier signal for forming the composite color video signal;

further comprising a central processing unit for generating said data;

memory means for storing said data;

cathode ray tube controller means for selectively reading said data stored in said memory means, said central processing unit and said cathode ray tube controller means reading said data stored in said memory means by supplying address signals thereto;

multiplexer means for alternately supplying said address signals from said central processing unit and said cathode ray tube controller means to said memory means to read said data stored therein; and character generator means responsive to said memory means for converting said data into dot character signals corresponding to said dots for representing a character.

22. The system of claim 21, in which said dot signals representing a character are supplied in parallel for each of said horizontal lines of said composite color video signal to be displayed on said visual display apparatus; and further comprising:

parallel to serial converting means for serially supplying said parallel-supplied dot signals;

video controller means for receiving said horizontal and vertical sync signals and said serially supplied dot signals and supplying color signals and said horizontal and vertical sync signals in response thereto; and encoding means for receiving said color signals, said horizontal and vertical sync signals, and said color subcarrier signal and generating said composite color video signal in response thereto.

* * * * *